United States Patent
Prabhakar et al.

(10) Patent No.: US 10,740,187 B1
(45) Date of Patent: Aug. 11, 2020

(54) SYSTEMS AND METHODS OF MANAGING AND CREATING SNAPSHOTS IN A CACHE-BASED STORAGE SYSTEM

(71) Applicant: EMC IP Holding Company LLC, Hopkinton, MA (US)

(72) Inventors: Vikram Prabhakar, Cary, NC (US); Joris Wils, Acton, MA (US); Shari Vietry, Merrimack, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/263,391

(22) Filed: Jan. 31, 2019

(51) Int. Cl.
*G06F 13/00* (2006.01)
*G06F 11/14* (2006.01)
*G06F 16/17* (2019.01)
*G06F 12/0815* (2016.01)

(52) U.S. Cl.
CPC ...... *G06F 11/1448* (2013.01); *G06F 11/1458* (2013.01); *G06F 11/1471* (2013.01); *G06F 12/0815* (2013.01); *G06F 16/1734* (2019.01)

(58) Field of Classification Search
CPC .............. G06F 11/1448; G06F 16/1734; G06F 12/0815; G06F 11/1471; G06F 11/1458
See application file for complete search history.

(56) References Cited

U.S. PATENT DOCUMENTS

| | | | | |
|---|---|---|---|---|
| 6,038,639 A * | 3/2000 | O'Brien | ............... | G06F 11/1435 711/114 |
| 6,081,875 A | 6/2000 | Clifton et al. | | |
| 6,651,075 B1 * | 11/2003 | Kusters | ............... | G06F 11/1448 |
| 6,823,436 B2 * | 11/2004 | Krishnamurthy | ..... | G06F 3/0601 711/170 |
| 7,111,014 B2 * | 9/2006 | Sawdon | ............... | G06F 11/1435 |
| 7,716,185 B2 | 5/2010 | Thompson et al. | | |
| 8,024,292 B2 | 9/2011 | Thompson et al. | | |
| 8,204,871 B1 | 6/2012 | Pawar et al. | | |
| 8,527,722 B1 * | 9/2013 | Okada | ............... | G06F 3/065 711/155 |
| 8,645,496 B2 | 2/2014 | Uhlmann et al. | | |
| 8,943,282 B1 * | 1/2015 | Armangau | ............ | G06F 16/128 711/162 |
| 2012/0311261 A1 * | 12/2012 | Mizuno | ............... | G06F 3/0611 711/118 |
| 2015/0261674 A1 * | 9/2015 | Wei | ............... | G06F 12/0866 711/135 |
| 2018/0004798 A1 * | 1/2018 | Kimura | ............... | G06F 12/0238 |
| 2018/0144014 A1 * | 5/2018 | Mittal | ............... | G06F 16/2322 |

* cited by examiner

*Primary Examiner* — Jing-Yih Shyu
(74) *Attorney, Agent, or Firm* — BainwoodHuang

(57) ABSTRACT

Techniques for providing a cache-based mechanism for snapshot management and creation in a data storage system. The techniques include creating, in a cache memory, a snapshot of a data volume such that the same data is shared between the data volume and the snapshot, and modifying, in the cache memory, one or more data pages among a plurality of data pages of the data volume. The techniques further include maintaining, on a list in the cache memory, copies of the data pages of the snapshot previously shared with the data volume prior to their modification, and maintaining, in a table in the cache memory, a copy record that contains information describing the relationship between the data volume and the snapshot. The techniques still further include flushing, in log order, the data pages of the snapshot and the copy record of the data volume and the snapshot to a storage device.

17 Claims, 9 Drawing Sheets

SYSTEMS AND METHODS OF MANAGING AND CREATING SNAPSHOTS IN A CACHE-BASED STORAGE SYSTEM

BACKGROUND

Data storage systems create snapshots of data objects at various times for a variety of purposes, including backing-up data, providing data recovery, improving application availability, and reducing data management costs, among others. Such snapshots record states of data storage systems by creating point-in-time (PIT) copies of data objects (e.g., data volumes), each of which is organized with associated metadata in a logical address space. Such data volumes include one or more extents of storage space within the logical address space, and the respective extents include multiple data blocks or pages of the same size or different sizes.

SUMMARY

A data storage system can create a snapshot of a data volume such that the data volume and its snapshot share the same data until one or more data blocks or pages of the data volume are modified or changed. Once the data pages of the data volume are changed, another snapshot of the data volume can be created by generating metadata that relates to portions of a logical address space corresponding to the changed data, and flushing the changed data and the corresponding metadata to a storage device. However, such an approach to creating snapshots in a data storage system can not only be time inefficient due to the large sizes of data volumes (e.g., ranging up to 1 terabyte (TB) or more), but can also lead to performance problems resulting from, for example, having to mark a data volume as "read-only" until snapshot creation is completed. Performance problems can also result when a data volume has many active clones.

Techniques are disclosed herein for allowing a data storage system to immediately create "read-only" snapshots and/or "read/write" clones by offloading consistency semantics to be handled by a cache memory subsystem, thereby allowing the data storage system to flush changed data and metadata in a background process. The disclosed techniques can include creating, in the cache memory subsystem, a snapshot of a data volume such that the same data is shared between the data volume and the snapshot, and modifying, in the cache memory subsystem, one or more data pages among a plurality of data pages of the data volume. The disclosed techniques can further include maintaining, on a list in the cache memory subsystem, copies of the data pages of the snapshot previously shared with the data volume prior to their modification, as well as maintaining, in a table in the cache memory subsystem, a copy record that contains information describing the relationship between the data volume and the snapshot. The disclosed techniques can still further include flushing, in log sequence order, the copies of the data pages of the snapshot and the copy record to a storage device. The disclosed techniques provide the ability to keep the quiesced time of the data volume to a minimum and allow consistent input/output (IO) performance both during and after many snapshot/clone creations.

In certain embodiments, a method of managing and creating snapshots in a cache-based storage system includes initiating, in a cache memory subsystem, creation of a snapshot of a data volume, in which the snapshot corresponds to a point-in-time (PIT) copy of the data volume, and the data volume includes a plurality of data pages shared with the snapshot. The method further includes modifying, in the cache memory subsystem, a data page among the plurality of data pages included in the data volume, and maintaining, on a list in the cache memory subsystem, a copy of the data page of the data volume previously shared with the snapshot before the modifying of the data page. The method still further includes flushing the copy of the data page to the storage device.

In certain arrangements, the method further includes maintaining, in a table in the cache memory subsystem, a copy record containing information pertaining to a relationship between the data volume and the snapshot, and flushing the copy record to the storage device to complete the creation of the snapshot of the data volume.

In certain arrangements, the method further includes maintaining each of the copy of the data page, the copy record, and the modified data page in a respective log record of a transaction log.

In certain arrangements, the method further includes maintaining a chain of versions of the data page on the list, ranging from a youngest version to an oldest version.

In certain arrangements, the list includes a plurality of versions of the data page, ranging from a youngest version to an oldest version of a parent data page. The method further includes maintaining the list of the youngest version to the oldest version, which are indirectly owned by one or more copy volumes.

In certain arrangements, the respective log record for each of the copy of the data page, the copy record, and the modified data page has a corresponding log sequence number (LSN), and the method further includes flushing, in log sequence order, the respective log record for each of the copy of the data page, the copy record, and the modified data page from the transaction log to the storage device.

In certain arrangements, the data volume has an identifier, the relationship between the data volume and the snapshot is defined at least in part by the identifier of the data volume and the LSN of the copy record, and the method further includes maintaining a plurality of information fields in the copy record, in which the plurality of information fields includes a first field containing the identifier of the data volume, and a second field containing the LSN of the copy record.

In certain arrangements, the method further includes maintaining, on the list in the cache memory subsystem, the copy of the data page and the LSN of the copy of the data page.

In certain arrangements, the method further includes creating, in the cache memory subsystem, a second snapshot of the data volume, in which the second snapshot corresponds to a PIT copy of the data volume including the modified data page among the plurality of data pages, and the modified data page corresponds to a first modification of the data page. The method further includes performing, in the cache memory subsystem, a second modification of the data page.

In certain arrangements, the method further includes maintaining, on the list in the cache memory subsystem, the copy of the data page, and a copy of the first modification of the data page.

In certain arrangements, the copy of the data page corresponds to an older version of the data page, and the copy of the first modification of the data page corresponds to a younger version of the data page. The method further includes maintaining a chain of versions of the data page on the list, ranging from the younger version to the older version.

In certain embodiments, a data storage system includes a memory including a cache memory subsystem, a storage device, and storage processing circuitry configured to execute a computer program out of the memory (i) to initiate, in the cache memory subsystem, creation of a snapshot of a data volume, the snapshot corresponding to a PIT copy of the data volume, the data volume including a plurality of data pages shared with the snapshot, (ii) to modify, in the cache memory subsystem, a data page among the plurality of data pages included in the data volume, (iii) to maintain, on a list in the cache memory subsystem, a copy of the data page of the data volume previously shared with the snapshot before the modifying of the data page, and (iv) to flush the copy of the data page to the storage device.

In certain arrangements, the storage processing circuitry is further configured to execute the computer program out of the memory to maintain, in a table in the cache memory subsystem, a copy record containing information pertaining to a relationship between the data volume and the snapshot, and to flush the copy record to the storage device to complete the creation of the snapshot of the data volume.

In certain arrangements, the storage processing circuitry is further configured to execute the computer program out of the memory to maintain each of the copy of the data page, the copy record, and the modified data page in a respective log record of a transaction log.

In certain arrangements, the respective log record for each of the copy of the data page, the copy record, and the modified data page has a corresponding log sequence number (LSN), and the storage processing circuitry is further configured to execute the computer program out of the memory to flush, in log sequence order, the respective log record for each of the copy of the data page, the copy record, and the modified data page from the transaction log to the storage device.

In certain arrangements, the data volume has an identifier, the relationship between the data volume and the snapshot is defined at least in part by the identifier of the data volume and the LSN of the copy record, and the storage processing circuitry is further configured to execute the computer program out of the memory to maintain a plurality of information fields in the copy record, the plurality of information fields including a first field containing the identifier of the data volume, and a second field containing the LSN of the copy record.

In certain arrangements, the storage processing circuitry is further configured to execute the computer program out of the memory to maintain, on the list in the cache memory subsystem, the copy of the data page and the LSN of the copy of the data page.

In certain embodiments, a computer program product includes a set of non-transitory, computer-readable media having instructions that, when executed by processing circuitry of a computerized apparatus, cause the processing circuitry to perform a method of managing and creating snapshots in a cache-based storage system. The cache-based storage system includes a cache memory subsystem and a storage device. The method includes initiating, in the cache memory subsystem, creation of a snapshot of a data volume, in which the snapshot corresponds to a PIT copy of the data volume, and the data volume includes a plurality of data pages shared with the snapshot. The method further includes modifying, in the cache memory subsystem, a data page among the plurality of data pages included in the data volume, maintaining, on a list in the cache memory subsystem, a copy of the data page of the data volume previously shared with the snapshot before the modifying of the data page, and flushing the copy of the data page to the storage device.

Other functions and aspects of the claimed features of this disclosure will be evident from the Detailed Description that follows.

BRIEF DESCRIPTION OF THE DRAWINGS

The foregoing and other objects, features, and advantages will be apparent from the following description of particular embodiments of the disclosure, as illustrated in the accompanying drawings, in which like reference characters refer to the same parts throughout the different views.

FIG. 1b is a block diagram of storage system components included in the data storage system of FIG. 1a;

FIGS. 2a-2f are diagrams illustrating an exemplary scenario for practicing the techniques of FIG. 1a, involving a namespace manager, a cache memory subsystem, and a transaction log included in the data storage system of FIG. 1a.

DETAILED DESCRIPTION

Techniques are disclosed herein for providing a cache-based mechanism for snapshot management and creation in a data storage system. The disclosed techniques can include creating, in a cache memory subsystem, a snapshot of a data volume such that the same data is shared between the data volume and the snapshot, and modifying, in the cache memory subsystem, one or more data pages among a plurality of data pages of the data volume. The disclosed techniques can further include maintaining, on a list in the cache memory subsystem, copies of the data pages of the snapshot previously shared with the data volume prior to their modification, as well as maintaining, in a table in the cache memory subsystem, a copy record that contains information describing the relationship between the data volume and the snapshot. The disclosed techniques can still further include flushing, in log sequence order, the copies of the data pages of the snapshot and the copy record to a storage device.

Figure 1A:
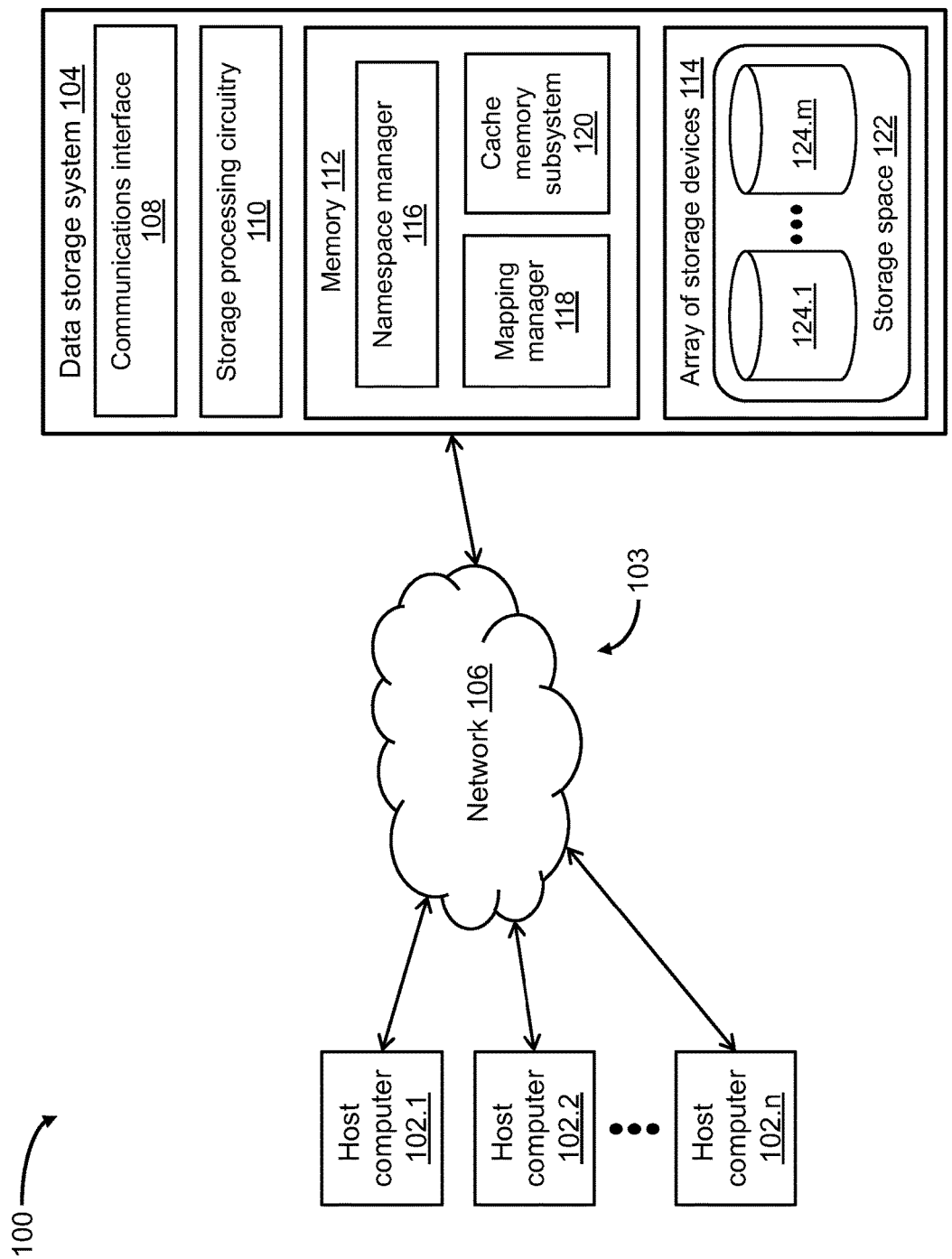
FIG. 1a is a diagram illustrating an exemplary storage system environment, in which techniques can be practiced for managing and creating snapshots in a data storage system.

FIG. 1a depicts an illustrative embodiment of an exemplary storage system environment 100, in which techniques can be practiced for managing and creating snapshots in a data storage system. As shown in FIG. 1a, the storage system environment 100 can include a plurality of host computers 102.1, 102.2, . . . , 102.n communicably coupled to a data storage system 104 by a communications medium 103, which can include at least one network 106. For example, each of the plurality of host computers 102.1, . . . , 102.n may be configured as a web server computer, a file server computer, an email server computer, an enterprise server computer, and/or any other suitable client or server computer or computerized device. The respective host computers 102.1, . . . , 102.n can be configured to provide storage input/output (JO) requests (e.g., small computer system interface (SCSI) commands, network file system (NFS) commands) to the data storage system 104 over the communications medium 103. Such storage IO requests provided by the respective host computers 102.1, ..., 102.n can direct the data storage system 104 to store (e.g., write) or retrieve (e.g., read) data pages, data blocks, data files, and/or any other suitable data elements to or from data volumes, file systems, and/or any other suitable storage objects on behalf of the plurality of host computers 102.1, ..., 102.n.

The communications medium 103 can be configured to interconnect the plurality of host computers 102.1, ..., 102.n and the data storage system 104 to enable them to communicate and exchange data and/or control signals. As shown in FIG. 1a, the communications medium 103 is illustrated as a "cloud" to represent a variety of different communications topologies, including a backbone topology, a hub-and-spoke topology, a loop topology, and an irregular topology, among others, or any suitable combination thereof. As such, the communications medium 103 can include copper-based data communications devices and cabling, fiber optic devices and cabling, wireless devices, or any suitable combination thereof. Further, the communications medium 103 can be configured to support storage area network (SAN)-based communications, network attached storage (NAS)-based communications, local area network (LAN)-based communications, metropolitan area network (MAN)-based communications, wide area network (WAN)-based communications, wireless communications, distributed infrastructure communications, and/or any other suitable wired, wireless, or fiber communications.

As further shown in FIG. 1a, the data storage system 104 can include a communications interface 108, storage processing circuitry 110, a memory 112, and an array of storage devices or drives 114. The communications interface 108 can include SCSI target adapters, network interface adapters, and/or any other suitable adapters for converting electronic, wireless, and/or optical signals received over the network 106 to a form suitable for use by the storage processing circuitry 110. The memory 112 can include persistent memory (e.g., flash memory, magnetic memory) and non-persistent memory (e.g., dynamic random access memory (DRAM), static random access memory (SRAM)), and can accommodate a variety of storage system constructs, components, and/or subsystems, including a namespace manager 116, a mapping manager 118, and a cache memory subsystem 120. It is noted that, in various embodiments, the namespace manager 116, the mapping manager 118, and the cache memory subsystem 120 can be implemented using any suitable hardware, software, or firmware configuration(s), or any suitable combination thereof.

The namespace manager 116 can be configured to maintain a namespace of storage objects, such as data volumes (e.g., virtual volumes (VVOLs), logical storage units (LUNs)), file systems, and/or any other suitable storage objects, which are accessible to the respective host computers 102.1, ..., 102.n. In general, a namespace is a point-in-time (PIT) logical collection of such storage objects, each of which can be represented by an index node (also referred to herein as an "inode"). In one embodiment, the namespace maintained by the namespace manager 116 can include a set of storage objects (e.g., VVOLs) organized as a collection of inodes. For example, each such VVOL may be made up of one or more storage extents or segments, each of which may correspond to a range of storage sizes (e.g., ranging up to 1 terabyte (TB) or more) in a logical address space. Further, the range of storage sizes may correspond to a range of contiguous or noncontiguous logical addresses spanning some or all of the VVOL.

The mapping manager 118 can be configured to map storage extents or segments of volumes (e.g., VVOLs, LUNs) to corresponding redundant array of independent disk (RAID) addresses, which, in turn, can be mapped to corresponding drive locations in the array of storage devices 114. The array of storage devices 114 can include storage space 122 implemented by a plurality of storage drives 124.1, ... 124.m (e.g., magnetic drives, solid state drives (SSDs), optical drives) managed by a RAID manager. The storage processing circuitry 110 can include one or more physical storage processors or engines, data movers, director boards, blades, IO modules, storage drive controllers, switches, and/or any other suitable computer hardware or combination thereof. In one embodiment, the storage processing circuitry 110 running specialized software can process storage IO requests provided by the respective host computers 102.1, ..., 102.n over the communications medium 103, and store host or user data as log-structured data in a RAID environment implemented by the array of storage devices 114.

In the context of the storage processing circuitry 110 being implemented using one or more processors running specialized software, a computer program product can be configured to deliver all or a portion of the software constructs, components, and/or subsystems to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (n), a secure digital (SD) chip or device, an application specific integrated circuit (ASIC), a field programmable gate array (FPGA), and so on. The non-transient computer-readable storage media can be encoded with sets of instructions that, when executed by the respective processor(s), perform the techniques disclosed herein. For example, such media may be considered to be articles of manufacture, and may be transportable from one data storage appliance to another data storage appliance.

Figure 1B:
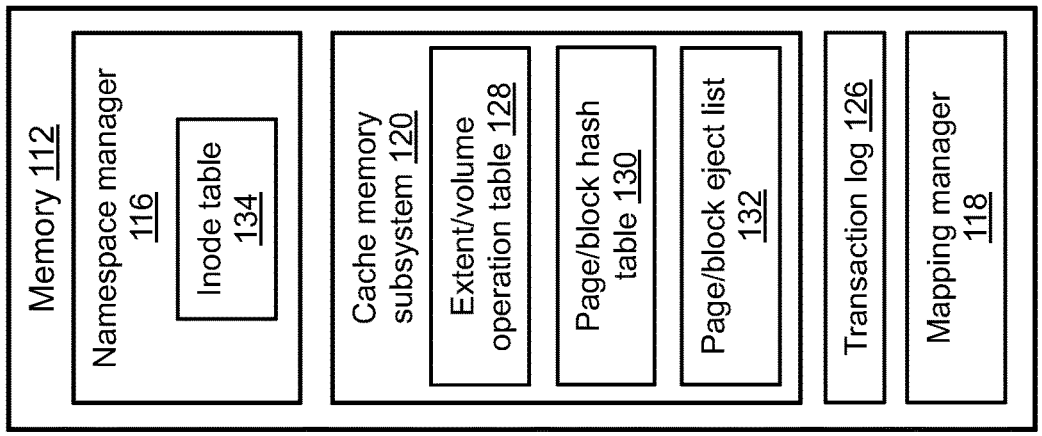

FIG. 1b depicts an illustrative embodiment of exemplary storage system constructs, components, and/or subsystems that can be accommodated in the memory 112 of the data storage system 104. As shown in FIG. 1b, the memory 112 can accommodate several such storage system constructs, components, and/or subsystems in addition to the namespace manager 116 and the mapping manager 118, namely, a cache memory subsystem 120 and a transaction log 126. As described herein, the namespace maintained by the namespace manager 116 can include a set of storage objects (e.g., VVOLs) organized as a collection of inodes. The namespace manager 116 can maintain such a collection of inodes in an inode table 134.

The cache memory subsystem 120 can be configured to include one or more cache memories arranged in parallel or hierarchically, or with multiple caching levels. For example, the cache memories may be implemented using flash memory, a solid-state drive(s), or any other suitable cache memory technology. Further, the cache memories may be large, such as up to 10% or more of the underlying storage. The cache memory subsystem 120 can be further configured to include an extent/volume operation table (also referred to herein as the "extent operation table") 128, a page/block hash table (also referred to herein as the "page hash table") 130, and a page/block eject list (also referred to herein as the "page eject list") 132.

The extent operation table 128 is a data structure configured to store a collection of records, each of which can include the following fields of information:

(i) Extent ID—a unique and immutable identifier (ID) that the namespace manager 116 assigns to a data volume, which can correspond to an extent of storage/memory space;

(ii) Extent Base LBA—the base address (LBA) of the extent/volume in the mapping manager 118 to which the extent/volume is mapped;

(iii) Extent No. of Blocks—the number of blocks in the extent of storage/memory space for the data volume;

(iv) Operation LSN—the log sequence number (LSN) of a storage operation;

(v) Operation Type—the type of storage operation (e.g., create, copy, invalidate);

(vi) Parent's Extent ID—the unique and immutable ID that the namespace manager 116 assigns to a parent volume of the data volume; and (vii) Child's LSN—the LSN of the most recent copy (or "snapshot", "clone") volume of the data volume.

Each such record can be added to, modified in, or deleted from the extent operation table 128 during the performance of a namespace or other storage operation. Further, the extent operation table 128 can be used to track the operations that can affect IO handling within the cache memory subsystem 120. It is noted that each of the fields of information (i)-(iv), (vi), and (vii) described hereinabove can be configured to store a 64-bit value (or any other suitable multi-bit value), and that the field (v) can be configured to store an 8-bit value (or any other suitable multi-bit value). It is further noted that each data page or block can consist of eight 512-byte sectors (i.e., 4 kilobytes (KB) total), or any other suitable number of bytes.

The page hash table 130 is a data structure configured to store an identifier such as a page/block hash (also referred to herein as a "page hash") (e.g., a Murmur Hash algorithm key), which can be generated for each data element (e.g., data page or "page", data block or "block") in a stream of data elements received at the data storage system 104.

The page eject list 132 is a data structure configured to store one or more chains or series of "dirty" pages or blocks, each of which can be ejected, evicted, or otherwise dissociated from a base or parent volume once the dirty block is modified in the base or parent volume. As employed herein, the term "dirty page" or "dirty block" refers to a page/block in the cache memory subsystem 120 that has not been synchronized with data stored in the array of storage devices 114. The page eject list 132 can be used to track one or more such pages/blocks that are contained (or "trapped") in a copy volume, but are no longer part of a corresponding base or parent volume. It is noted that each dirty page/block in a chain or series of dirty pages/blocks on the page eject list 132 is not directly referenced by a page hash identifier in the page hash table 130. Rather, within the page eject list 132, a series of versions of the dirty page/block are listed in order from the younger (or youngest) version to the older (or oldest) version. Moreover, the younger (or youngest) version of the dirty page/block on the page eject list 132 is further chained to the most recent version of the dirty page/block, which is directly referenced by a page hash identifier in the page hash table 130 and remains part of the corresponding base or parent volume.

The transaction log 126 is a data structure configured to record all of the namespace/storage operations (e.g., create, copy, invalidate) performed in association with the cache memory subsystem 120. Each log record in the transaction log 126 can be periodically flushed (e.g., every 30 seconds, every minute, every 2 minutes) from the transaction log 126 to the mapping manager 118. It is noted that the transaction log 126 can be persisted in the memory 112 (such as by a battery backup), as well as mirrored to another memory (not shown) so that, in the event of a system crash, the logged record of completed namespace/storage operations can be rebuilt and preserved.

During operation, the data storage system 104 (see FIG. 1a) can provide a cache-based mechanism for snapshot management and creation. To that end, the data storage system 104 can create, in the cache memory subsystem 120 (see FIG. 1b), a snapshot of a data volume such that the same data is shared between the data volume and the snapshot, and modify, in the cache memory subsystem 120, one or more data pages among a plurality of data pages of the data volume. The data storage system 104 can also maintain, on the page eject list 132 (see FIG. 1b), copies of the data pages of the snapshot previously shared with the data volume prior to their modification, as well as maintain, in the extent operation table 128 (see FIG. 1b), a copy record that contains information describing the relationship between the data volume and the snapshot. In addition, the data storage system 104 can flush, in log sequence order, the copies of the data pages of the snapshot and the copy record from the transaction log 126 (see FIG. 1b) to the mapping manager 118 for subsequent mapping to the array of storage devices 114.

Figure 2A:
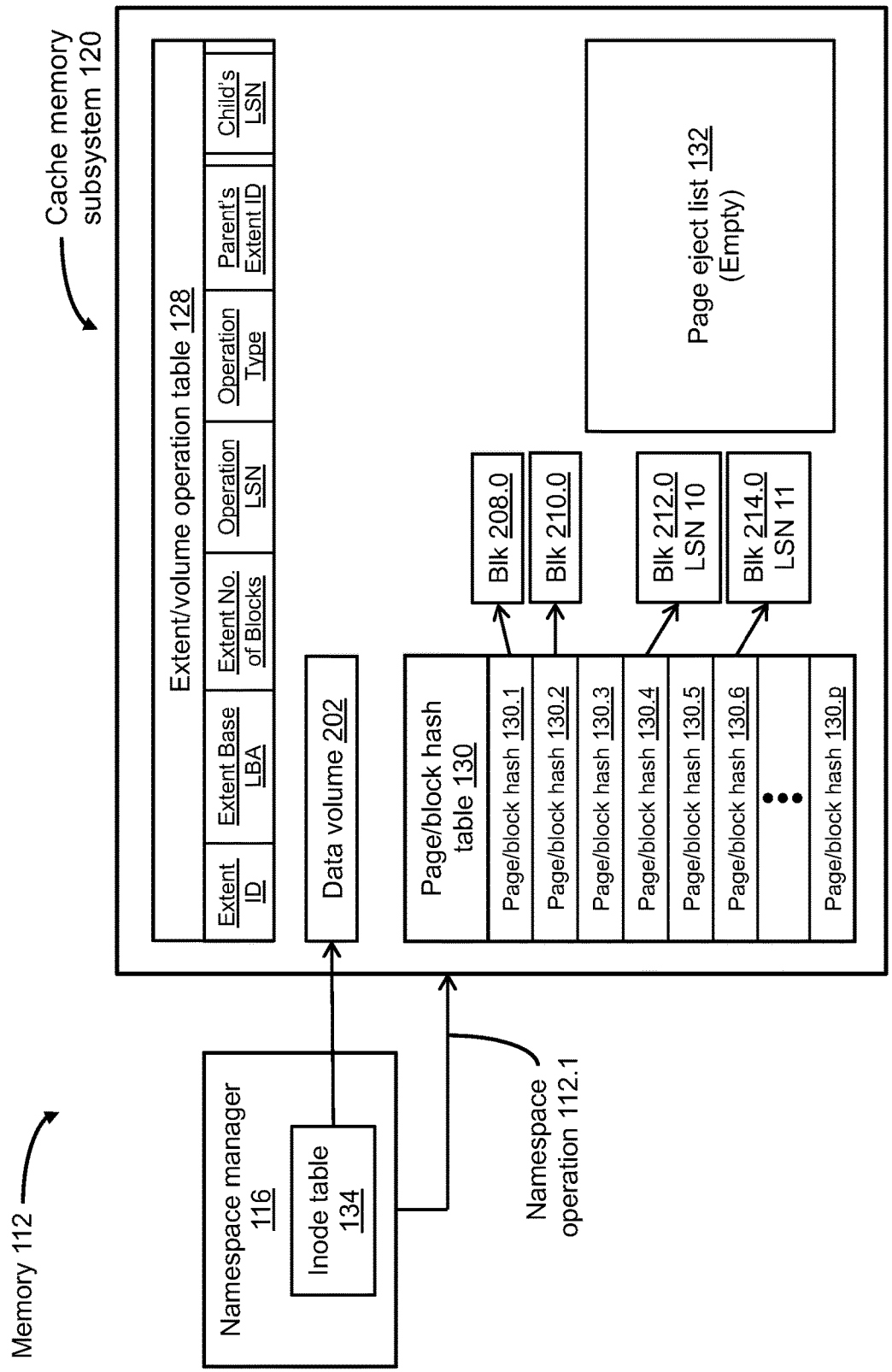

The disclosed techniques for providing a cache-based mechanism for snapshot management and creation in a data storage system will be further understood with reference to the following illustrative example, as well as FIGS. 1a, 1b, and 2a-2f. FIG. 2a depicts an exemplary representation of the cache memory subsystem 120 included in the memory 112 of the data storage system 104 (see FIG. 1a). As shown in FIG. 2a, the cache memory subsystem 120 can include the extent operation table 128, the page hash table 130, and the page eject list 132. Further, the page hash table 130 can include a plurality of page hashes 130.1, . . . , 130.6, . . . , 130.p, which can be generated as identifiers for a plurality of data elements (e.g., pages, blocks) received at the data storage system 104 from the respective host computers 102.1, . . . , 102.n.

In this example, the namespace manager 116 issues namespace operations 112.1, 112.2, 112.3 (see FIGS. 2a, 2b, and 2d), which can be performed in conjunction with the cache memory subsystem 120, as well as the mapping manager 118 (see FIGS. 1a and 1b) to assure data/metadata consistency. As shown in FIG. 2a, the namespace manager 116 can issue a namespace operation 112.1, such as a "create" namespace operation. For example, the "create" namespace operation 112.1 may be issued to create a data volume 202 within the cache memory subsystem 120, providing information including the Extent ID (e.g., 1), the Extent Base LBA (e.g., 0x100), and the Extent No. of Blocks (e.g., 0x100) for the data volume 202. Once the namespace manager 116 has issued the "create" namespace operation 112.1, an inode is generated in the inode table 134, pointing to the data volume 202 in the cache memory subsystem 120. Further, the cache memory subsystem 120 generates a record ("Record 1") for the extent operation table 128, as illustrated in TABLE I below:

TABLE I

|  | Extent ID | Extent Base LBA | Extent No. of Blocks | Operation LSN | Operation Type | Parent's Extent ID | Child's LSN |
|---|---|---|---|---|---|---|---|
| Record 1 | 1 | 0x100 | 0x100 | 9 | Create | 0 | 0 |

It is noted that, in Record 1 (see TABLE I), each of the Parent's Extent ID and the Child's LSN is indicated as "0" because, at this time, the data volume 202 does not have an associated parent volume or child (e.g., copy) volume. It is further noted that, in Record 1 (see TABLE I), the Operation LSN is indicated as "9" for purposes of illustration. Although the data volume 202 (as well as copy volumes 204, 206; see FIGS. 2b-2f) is depicted as a distinct entity in FIG. 2a (see also FIGS. 2b-2f), it should be understood that the data volume 202 (as well as copy volumes 204, 206; see FIGS. 2b-2f) is meant to be an illustrative representation of a data volume. In addition, although the inode table 134 is depicted in FIG. 2a, for purposes of illustration, as having an inode that points to the illustrative representation of the data volume 202 (see also FIGS. 2b-2f, in which arrows are shown extending from the inode table 134 to each of copy volume 204 and copy volume 206), it should be understood that the inode table 134 can refer to the appropriate actual entries in the extent operation table 128 when referencing a data or copy volume.

In this example, it is assumed that the data volume 202 in the cache memory subsystem 120 contains a number of data blocks, including a block ("Blk") 208.0, a block ("Blk") 210.0, a block ("Blk") 212.0, and a block ("Blk") 214.0. It is further assumed that Blk 208.0, Blk 210.0, Blk 212.0, and Blk 214.0 are dirty blocks belonging to the data volume 202. As shown in FIG. 2a, the page hash 130.1, the page hash 130.2, the page hash 130.4, and the page hash 130.6 can point to Blk 208.0, Blk 210.0, Blk 212.0, and Blk 214.0, respectively. In addition, it was described herein that the page eject list 132 can be configured to store one or more chains of dirty blocks, each of which can be ejected from a base or parent volume once the dirty block is modified (e.g., written to) in the base or parent volume. In this example, to aid in the preparation of the page eject list 132 (which, at this time, does not contain any ejected blocks, i.e., the page eject list 132 is "empty"), the cache memory subsystem 120 maintains an LSN of "10" for Blk 212.0, and an LSN of "11" for Blk 214.0. It is noted that the LSNs for Blk 212.0 and Blk 214.0 are indicated as 10 and 11, respectively, for purposes of illustration, and that the LSNs for Blk 208.0 and Blk 210.0 are not shown for purposes of clarity.

Accordingly, in the cache memory subsystem 120, Blk 212.0 can be identified by the information provided in TABLE II below:

TABLE II

| | LBA | Extent ID | LSN | Dirty? |
|---|---|---|---|---|
| Blk 212.0 (FIG. 2a) | 0x100 | 1 | 10 | Yes |

Similarly, in the cache memory subsystem 120, Blk 214.0 can be identified by the information provided in TABLE III below:

TABLE III

| | LBA | Extent ID | LSN | Dirty? |
|---|---|---|---|---|
| Blk 214.0 (FIG. 2a) | 0x108 | 1 | 11 | Yes |

It is noted that the LBAs for Blk 212.0 and Blk 214.0 are indicated as 0x100 (see TABLE II) and 0x108 (see TABLE III), respectively, for purposes of illustration.

Figure 2B:
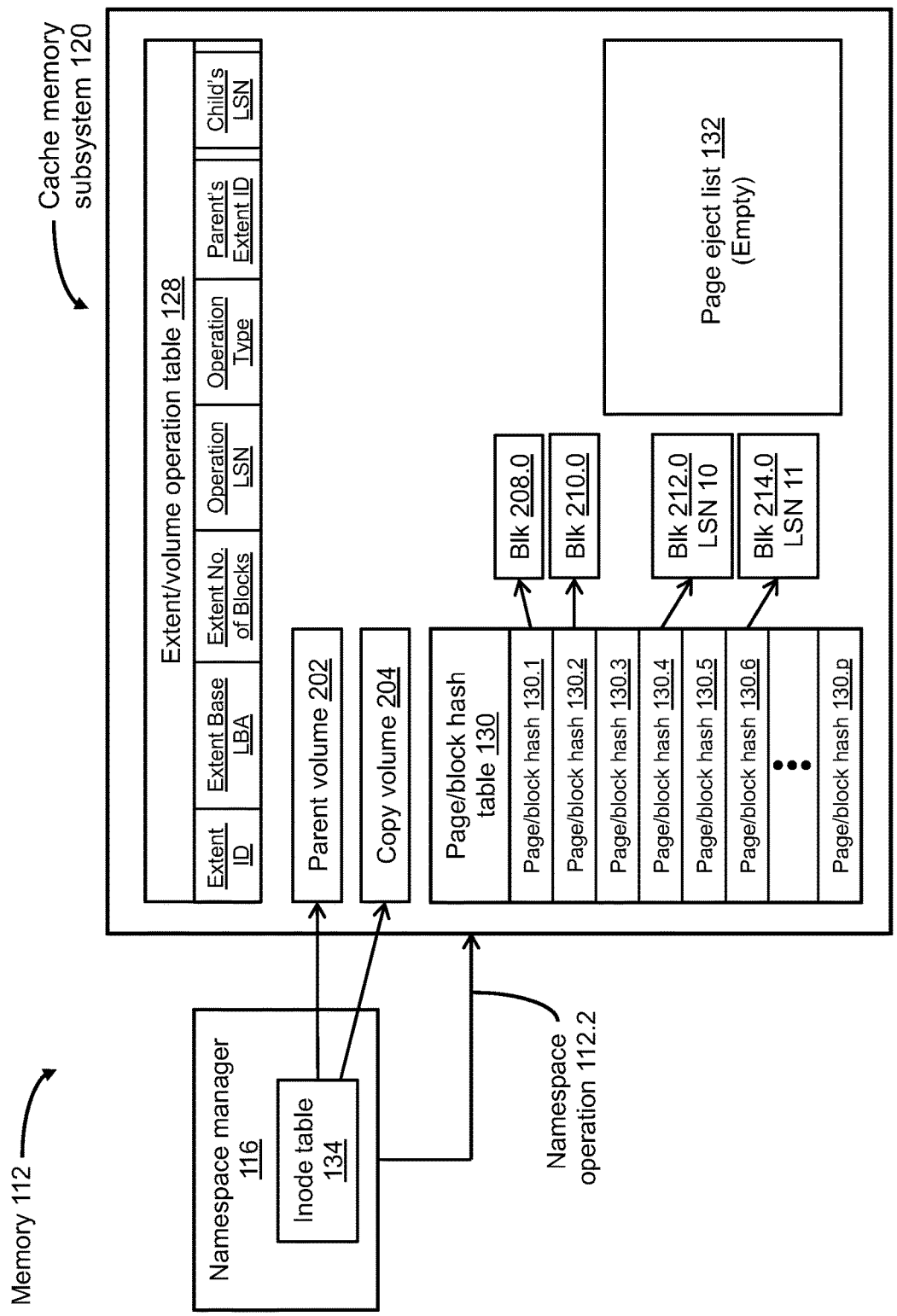

FIG. 2b depicts the cache memory subsystem 120 after a copy (e.g., snapshot/clone) of the data volume 202 has been created. As shown in FIG. 2b, the namespace manager 116 can issue a namespace operation 112.2, such as a "copy" namespace operation. For example, the "copy" namespace operation 112.2 may be issued to create a copy volume 204 within the cache memory subsystem 120, providing information including the Parent's Extent ID (i.e., 1), the Parent's Base LBA (i.e., 0x100), the Parent's Extent No. of Blocks (i.e., 0x100), the Copy's Extent ID (e.g., 2), the Copy's Base LBA (e.g., 0x200), the Copy's Extent No. of Blocks (e.g., 0x100).

Once the namespace manager 116 has issued the "copy" namespace operation 112.2, another inode is generated in the inode table 134, pointing to the copy volume 204 in the cache memory subsystem 120. Further, the cache memory subsystem 120 modifies Record 1 (see TABLE I) in the extent operation table 128, as illustrated in TABLE IV below:

TABLE IV

| | Extent ID | Extent Base LBA | Extent No. of Blocks | Operation LSN | Operation Type | Parent's Extent ID | Child's LSN |
|---|---|---|---|---|---|---|---|
| Record 1 | 1 | 0x100 | 0x100 | 9 | Parent | 0 | 12 |

As indicated by the modified Record 1 (see TABLE IV), the Operation Type has been changed from "Create" to "Parent", and the Child's LSN has been changed from "0" to "12". It is noted that, in the modified Record 1 (see TABLE IV), the Child's LSN has been indicated as 12 for purposes of illustration.

In addition, the cache memory subsystem 120 adds Record 2 to the extent operation table 128, as illustrated in TABLE V:

TABLE V

| | Extent ID | Extent Base LBA | Extent No. of Blocks | Operation LSN | Operation Type | Parent's Extent ID | Child's LSN |
|---|---|---|---|---|---|---|---|
| Record 1 | 1 | 0x100 | 0x100 | 9 | Parent | 0 | 12 |
| Record 2 | 2 | 0x200 | 0x100 | 12 | Child | 1 | 0 |

It is noted that, in Record 2 (see TABLE V), the Child's LSN is indicated as "0" because the copy volume 204 does not have an associated child (e.g., copy) volume. It is further noted that each of Blk 208.0, Blk 210.0, Blk 212.0, and Blk 214.0 (see FIG. 2b) belongs to the parent volume 202, and is indirectly owned by the copy volume 204 or successor copy volumes.

Figure 2C:
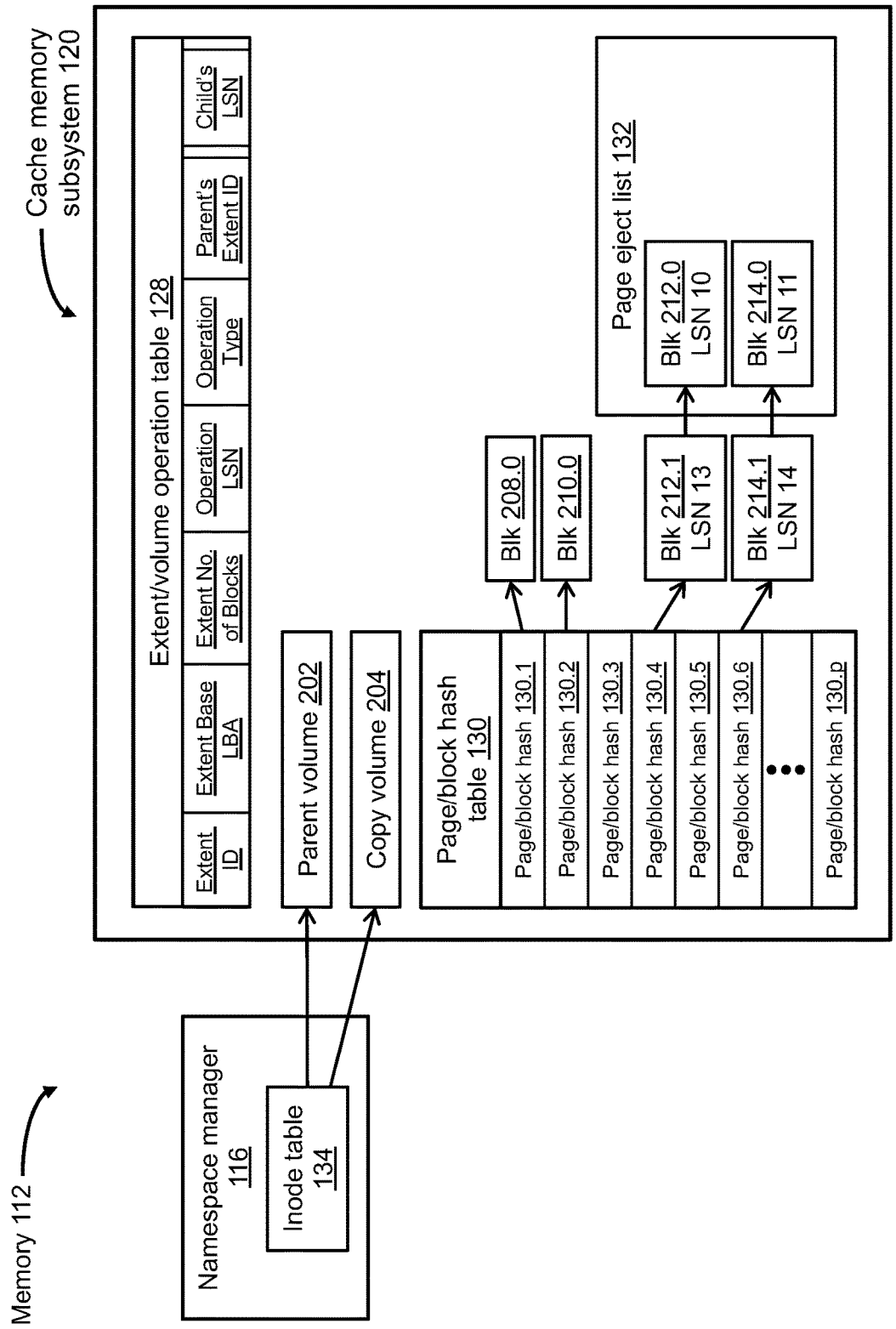

FIG. 2c depicts the cache memory subsystem 120 after Blk 212.0 and Blk 214.0 are modified (e.g., written to), resulting in Blk 212.1 and Blk 214.1, respectively. It is noted that the LSNs for Blk 212.1 and Blk 214.1 are indicated as 13 and 14, respectively, for purposes of illustration. Because Blk 212.1 and Blk 214.1 are modifications of Blk 212.0 and Blk 214.0, respectively, Blk 212.1 and Blk 214.1 now belong to the parent volume 202, while Blk 212.0 and Blk 214.0 are trapped in the copy volume 204. In other words, the parent volume 202 does not share Blk 212.1 and Blk 214.1 with the copy volume 204. As a result, each of Blk 212.0 and Blk 214.0 is ejected from the parent volume 202 and placed on the page eject list 132 (see FIG. 2c).

Figure 2D:
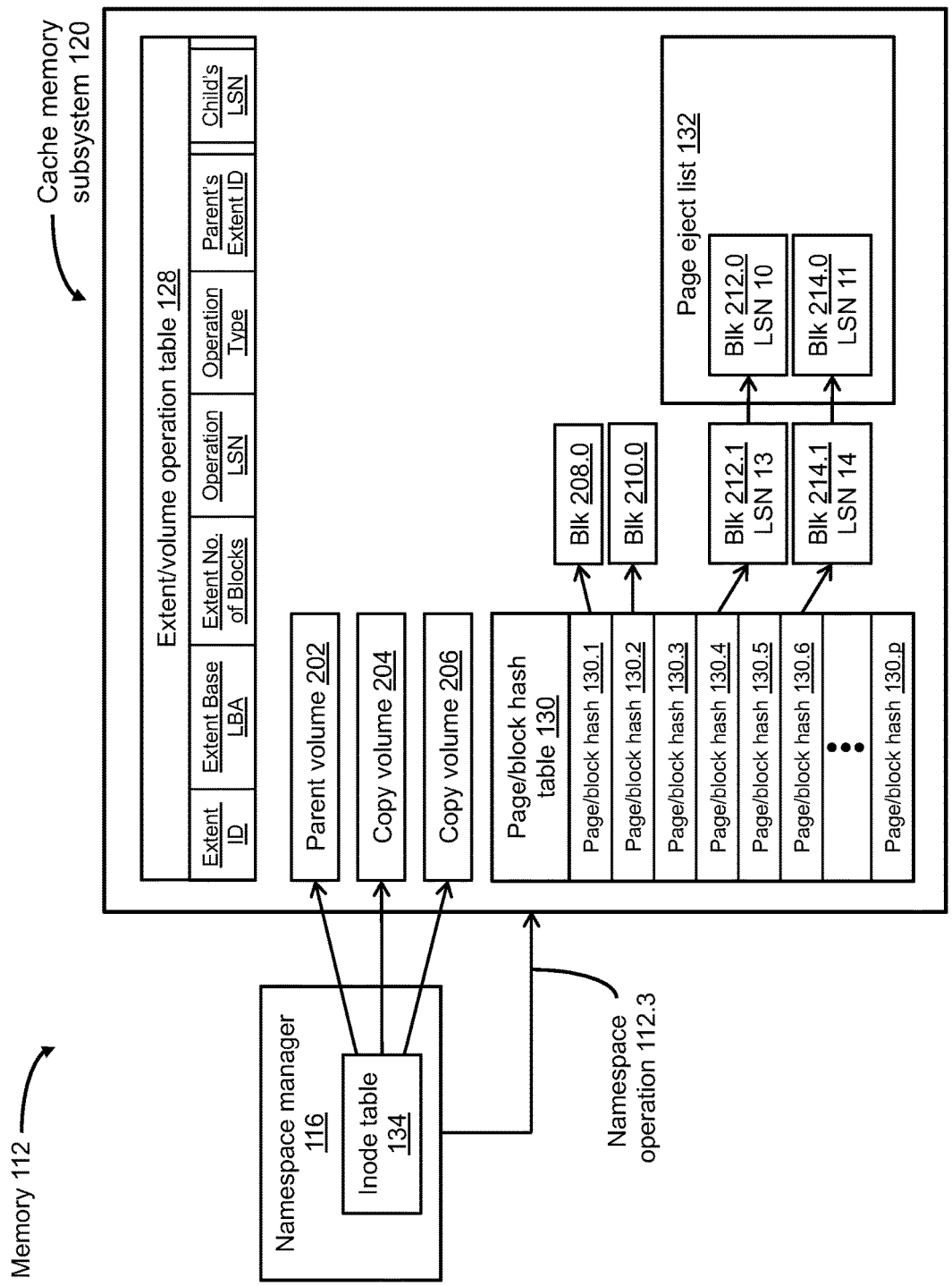

FIG. 2d depicts the cache memory subsystem 120 after another copy (e.g., snapshot/clone) of the data volume 202 has been created. As shown in FIG. 2d, the namespace manager 116 can issue a namespace operation 112.3, such as another "copy" namespace operation. For example, the "copy" namespace operation 112.3 may be issued to create a copy volume 206 within the cache memory subsystem 120, providing information including the Parent's Extent ID (i.e., 1), the Parent's Base LBA (i.e., 0x100), the Parent's Extent No. of Blocks (i.e., 0x100), the Copy's Extent ID (e.g., 3), the Copy's Base LBA (e.g., 0x300), the Copy's Extent No. of Blocks (e.g., 0x100).

Once the namespace manager 116 has issued the "copy" namespace operation 112.3, another inode is generated in the inode table 134, pointing to the copy volume 206 in the cache memory subsystem 120. Further, the cache memory subsystem 120 again modifies Record 1 (see TABLE V) in the extent operation table 128, as illustrated in TABLE VI:

TABLE VI

| | Extent ID | Extent Base LBA | Extent No. of Blocks | Operation LSN | Operation Type | Parent's Extent ID | Child's LSN |
|---|---|---|---|---|---|---|---|
| Record 1 | 1 | 0x100 | 0x100 | 9 | Parent | 0 | 15 |

As indicated by the modified Record 1 (see TABLE VI), the Child's LSN has been changed from "12" to "15". It is noted that, in the modified Record 1 (see TABLE VI), the Child's LSN has been indicated as 15 for purposes of illustration.

In addition, the cache memory subsystem 120 adds Record 3 to the extent operation table 128, as illustrated in TABLE VII below:

TABLE VII

| | Extent ID | Extent Base LBA | Extent No. of Blocks | Operation LSN | Operation Type | Parent's Extent ID | Child's LSN |
|---|---|---|---|---|---|---|---|
| Record 1 | 1 | 0x100 | 0x100 | 9 | Parent | 0 | 15 |
| Record 2 | 2 | 0x200 | 0x100 | 12 | Child | 1 | 0 |
| Record 3 | 3 | 0x300 | 0x100 | 15 | Child | 1 | 0 |

It is noted that, in Record 3 (see TABLE VII), the Child's LSN is indicated as "0" because the copy volume 206 does not have an associated child (e.g., copy) volume. It is further noted that each of Blk 208.0, Blk 210.0, Blk 212.1, and Blk 214.1 (see FIG. 2d) belongs to both the parent volume 202 and the copy volume 206. However, in the cache memory subsystem 120, the dirty blocks 212.1 and 214.1 will remain trapped in the copy volume 206.

Figure 2E:
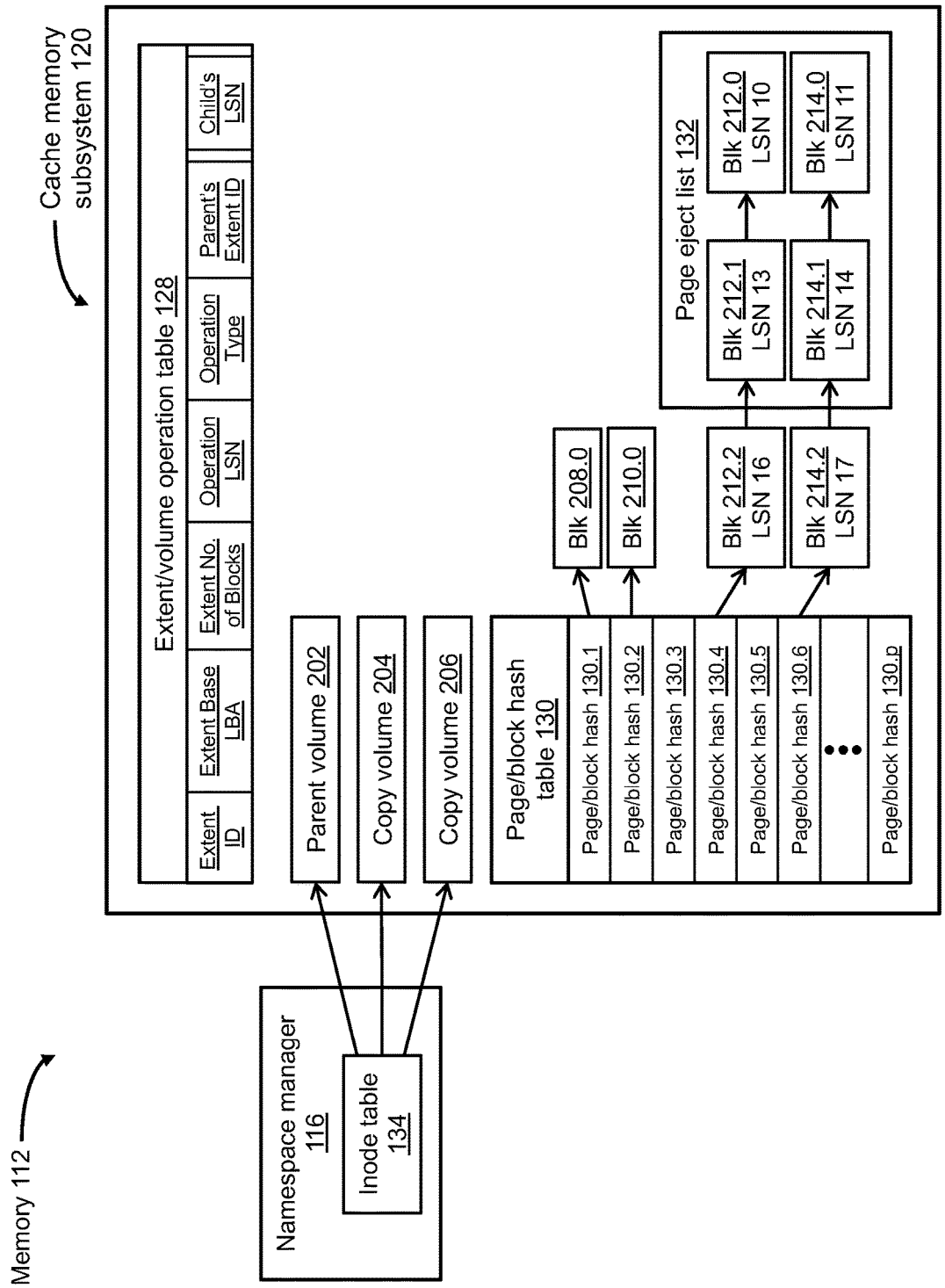

FIG. 2e depicts the cache memory subsystem 120 after Blk 212.1 and Blk 214.1 are modified (e.g., written to), resulting in Blk 212.2 and Blk 214.2, respectively. It is noted that the LSNs for Blk 212.2 and Blk 214.2 are indicated as 16 and 17, respectively, for purposes of illustration. Because Blk 212.2 and Blk 214.2 are modifications of Blk 212.1 and Blk 214.1, respectively, Blk 212.2 and Blk 214.2 now belong to the parent volume 202, while Blk 212.1 and Blk 214.1 are trapped in the copy volume 206. In other words, the parent volume 202 does not share Blk 212.2 and Blk 214.2 with the copy volume 206. As a result, Blk 212.1 and Blk 214.1 are ejected from the parent volume 202, and placed on the page eject list 132 (see FIG. 2e).

Figure 2F:
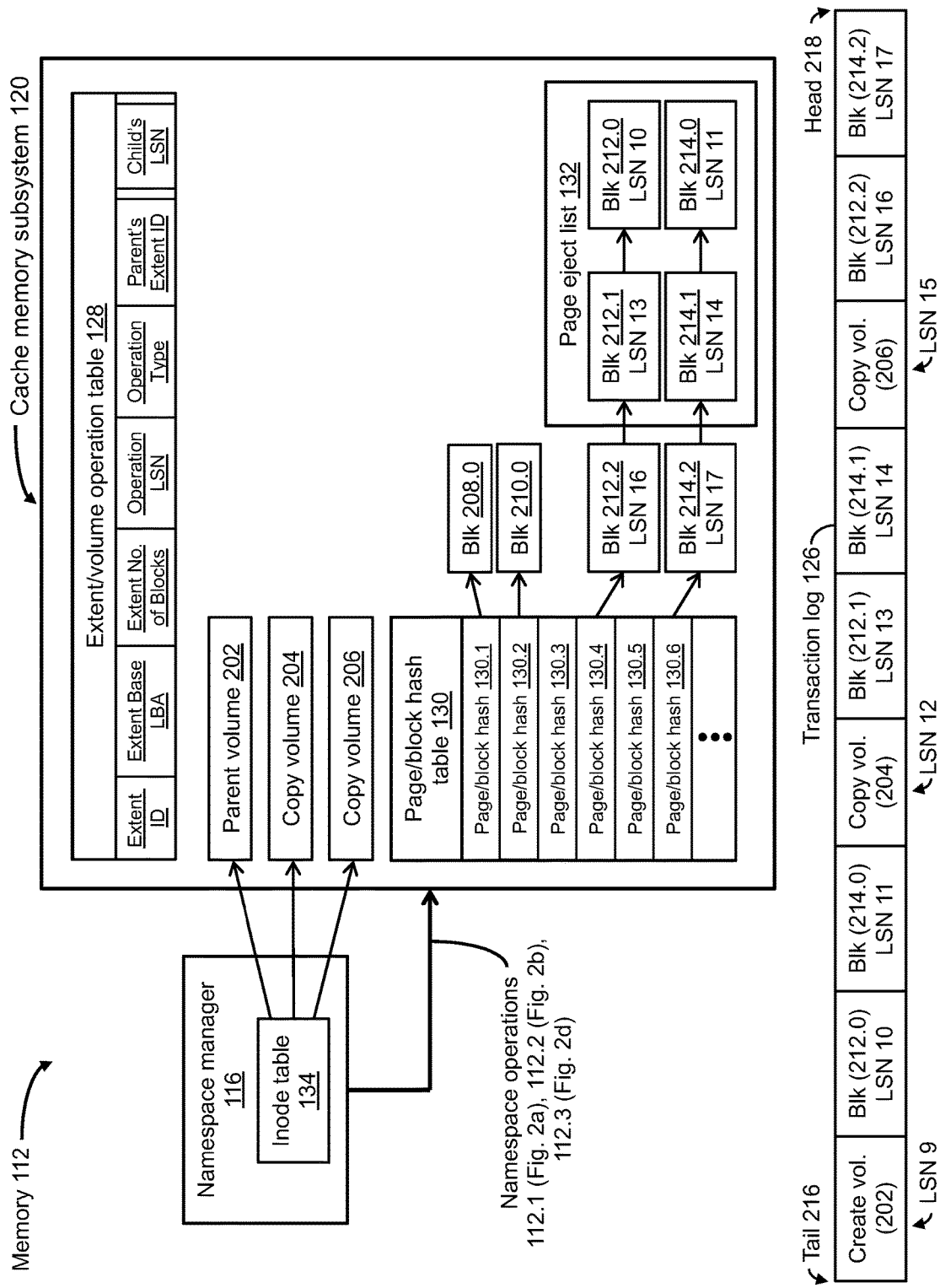

FIG. 2f depicts the cache memory subsystem 120, including the extent operation table 128, the data (parent) volume 202, the copy volume 204, the copy volume 206, the page hash table 130, and the page eject list 132. As shown in FIG. 2f, the cache memory subsystem 120 includes (i) Blk 208.0 and Blk 210.0, each of which belongs to each of the parent volume 202, the copy volume 204, and the copy volume 206, (ii) Blk 212.2 and Blk 214.2, each of which belongs to the parent volume 202, (iii) Blk 212.1 and Blk 214.1, each of which is trapped in the copy volume 206, and (iv) Blk 212.0 and Blk 214.0, each of which is trapped in the copy volume 204. Further, within the page eject list 132, a series of versions of Blk 212.x (i.e., Blk 212.1, Blk 212.0) are chained or otherwise listed in order from the younger version (i.e., Blk 212.1) to the older version (i.e., Blk 212.0). Likewise, within the page eject list 132, a series of versions of Blk 214.x (i.e., Blk 214.1, Blk 214.0) are chained or otherwise listed in order from the younger version (i.e., Blk 214.1) to the older version (i.e., Blk 214.0). In addition, the most recent (i.e., youngest) version of Blk 212.x, namely, Blk 212.2, is chained in series to the younger version of Blk 212.x (i.e., Blk 212.1) on the page eject list 132. Likewise, the most recent (i.e., youngest) version of Blk 214.x, namely, Blk 214.2, is chained in series to the younger version of Blk 214.x (i.e., Blk 214.1) on the page eject list 132.

It is noted that the data storage system 104 can employ information contained in the extent operation table 128 and/or the page eject list 132 while processing storage IO "read" requests involving data blocks contained in a copy volume. For example, the read request may involve a data block either on the page eject list 132 or shared between a parent volume and the copy volume. In one embodiment, upon a cache-miss (or a partial-miss) resulting from the read request, the data storage system 104 can process the read request by looking up the version of the data block contained in the parent volume, using the LBA and the extent ID of the parent volume from the extent operation table 128. Next, if we find the parent page in the page/block hash table 130 with the matching LBA and extent ID, then a search can be performed for the most recent version of the data block that is earlier than the "create" operation LSN (ReadLSN). The most recent (i.e., youngest) version of the data block can be located based on the LSN of each version of the data block, looking first at the LSN of the version of the data block contained in the parent page, and then at the LSNs of the versions of the data blocks on the page eject list 132 (from younger (or youngest) version to older (or oldest) version). Any valid sectors of the most recent version of the data block can then be accessed. If all eight valid sectors of the data block can be successfully accessed, then the processing of the read request is completed. Otherwise, if all eight valid sectors of the data block cannot be successfully accessed, then a determination can be made as to whether the parent volume itself has a parent volume, and, if so, then the process can be repeated using the information of the new parent volume. If not, then the data block can be loaded from the mapping manager 118.

In this scheme, the cache memory subsystem 120 allows writes to both the parent volume and the copy volume(s) (e.g., snapshots or clones). When a parent volume's dirty page is overwritten, the old dirty page (shared with the copy volume) is placed on the page eject list 132, and the newly added dirty page (which is not part of the previous copy volume) gets a new LSN, which will not be compatible with the ReadLSN of the copy volume. The writes to clones can occur with no interference with parent volumes.

FIG. 2f further depicts the namespace manager 116 (including the inode table 134), and the transaction log 126. In one embodiment, the transaction log 126 can be implemented as a circular journal, including a tail 216 and a head 218. As shown in FIG. 2f, information relating to operations contained in the extent operation table 128 can be persisted in the transaction log 126 in the same order (e.g., log order, time order) as the operations were originally performed. For example, starting from the tail 216 and continuing toward the head 218, the transaction log 126 may contain log records for the following operations:

(i) Create vol. (202), LSN 9—the namespace operation 112.1 for creating the data volume 202;
   (ii) Blk (212.0), LSN 10—the write operation for modifying Blk 212.0;
   (iii) Blk (214.0), LSN 11—the write operation for modifying Blk 214.0;
   (iv) Copy vol. (204), LSN 12—the namespace operation 112.2 for creating the copy volume 204;
   (v) Blk (212.1), LSN 13—the write operation for modifying Blk 212.1;
   (vi) Blk (214.1), LSN 14—the write operation for modifying Blk 214.1;
   (vii) Copy vol. (206), LSN 15—the namespace operation 112.3 for creating the copy volume 206;
   (viii) Blk (212.2), LSN 16—the write operation for modifying Blk 212.2; and
   (ix) Blk (214.2), LSN 17—the write operation for modifying Blk 214.2.

As described herein, each log record in the transaction log 126 can be periodically flushed (such as in a background process) from the transaction log 126 to the mapping manager 118 for subsequent processing and/or storage. To that end, the log records contained in the transaction log 126 can be flushed to the mapping manager 118 in the following sequence (ranging from the tail 216 to the head 218):

(i) Log record (Record 1) for Create vol. (202) at LSN 9;
   (ii) Log record for Blk (212.0) at LSN 10 (once this log record is flushed to the mapping manager 118, the memory space for Blk 212.0 can be reclaimed);
   (iii) Log record for Blk (214.0) at LSN 11 (once this log record is flushed to the mapping manager 118, the memory space for Blk 214.0 can be reclaimed);
   (iv) Log record (Record 2) for Copy vol. (204) at LSN 12 (once this log record is flushed to the mapping manager 118, the creation of the copy (snapshot/clone) volume 204 is completed, and this log record (Record 2) relating to copy volume 204 is removed from the extent operation table 128);
   (v) Log record for Blk (212.1) at LSN 13 (once this log record is flushed to the mapping manager 118, the memory space for Blk 212.1 can be reclaimed);
   (vi) Log record for Blk (214.1) at LSN 14 (once this log record is flushed to the mapping manager 118, the memory space for Blk 214.1 can be reclaimed);
   (vii) Log record (Record 3) for Copy vol. (206) at LSN 15 (once this log record is flushed to the mapping manager 118, the creation of the copy (snapshot/clone) volume 206 is completed, and this log record (Record 2) relating to the copy volume 206, as well as the log record (Record 1) for the data (parent) volume 202, are removed from the extent operation table 128);
   (viii) Log record for Blk (212.2) at LSN 16 (once this log record is flushed to the mapping manager 118, the memory space for Blk 212.2 can be reclaimed); and
   (ix) Log record for Blk (214.2) at LSN 17 (once this log record is flushed to the mapping manager 118, the memory space for Blk 214.2 can be reclaimed).

Having described the foregoing illustrative embodiments, other alternative embodiments and/or variations may be made and/or practiced. For example, it was described herein that the types of namespace operations performed within the data storage system 104 could include a "create" namespace operation, a "copy" namespace operation, and an "invalidate" namespace operation. In one embodiment, such an "invalidate" namespace operation can be issued to delete a data volume from the cache memory subsystem 120, providing information including the Extent ID (e.g., 4), the Extent Base LBA (e.g., 0x400), and the Extent No. of Blocks (e.g., 0x100) for the data volume. Further, the cache memory subsystem 120 can generate an invalidate record for the extent operation table 128, as illustrated in TABLE VIII below:

TABLE VIII

| | Extent ID | Extent Base LBA | Extent No. of Blocks | Operation LSN | Operation Type | Parent's Extent ID | Child's LSN |
|---|---|---|---|---|---|---|---|
| Record | 4 | 0x400 | 0x100 | 18 | Invalidate | 0 | 0 |

It is noted that, in the Record of TABLE VIII, the Operation LSN is indicated as "18" for purposes of illustration. Because the extent operation table 128 includes an invalidate record for the data volume, the cache memory subsystem 120 can designate any data block(s) within the cache memory subsystem that belong to the data volume as also being invalid, and reclaim the memory space for the invalid data block(s) in a background process.

Figure 3:
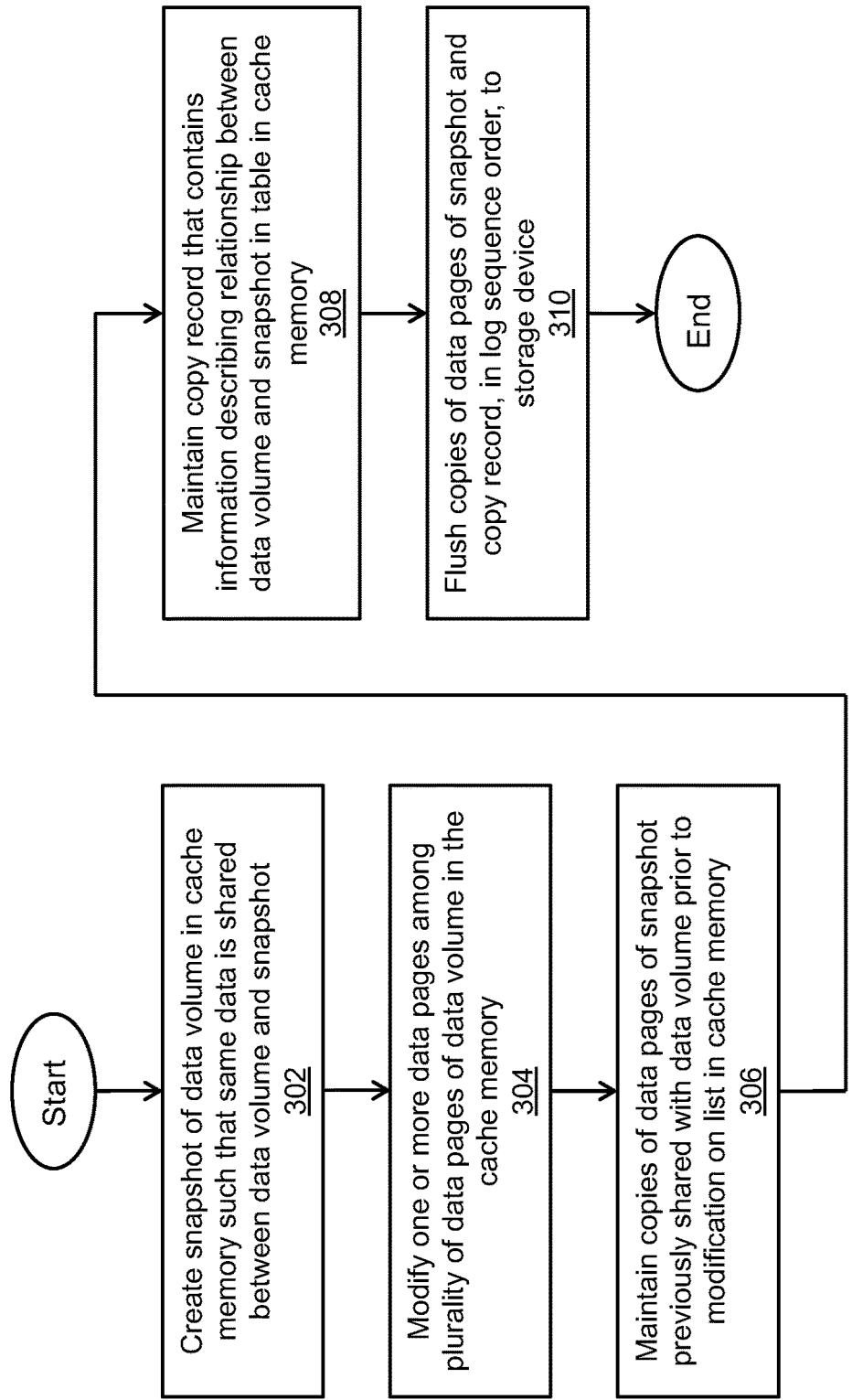
FIG. 3 is a flow diagram illustrating an exemplary method of managing and creating snapshots in a data storage system.

A method of providing a cache-based mechanism for snapshot management and creation in a data storage system is described below with reference to FIG. 3. As depicted in block 302, a snapshot of a data volume is created, in a cache memory, such that the same data is shared between the data volume and the snapshot. As depicted in block 304, one or more data pages among a plurality of data pages of the data volume are modified in the cache memory. As depicted in block 306, copies of the data pages of the snapshot previously shared with the data volume prior to their modification are maintained on a list in the cache memory. As depicted in block 308, a copy record that contains information describing the relationship between the data volume and the snapshot is maintained in a table in the cache memory. As depicted in block 310, the copies of the data pages of the snapshot and the copy record are flushed, in log sequence order, to a storage device.

While various embodiments of the disclosure have been particularly shown and described, it will be understood by those skilled in the art that various changes in form and details may be made therein without departing from the scope of the disclosure as defined by the appended claims.

What is claimed is:

1. A method of managing and creating snapshots in a cache-based storage system, the cache-based storage system including a cache memory subsystem and a storage device, the method comprising:

initiating, in the cache memory subsystem, creation of a snapshot of a data volume, the snapshot corresponding to a point-in-time (PIT) copy of the data volume, the data volume including a plurality of data pages shared with the snapshot;

modifying, in the cache memory subsystem, a data page among the plurality of data pages included in the data volume;

maintaining, on a list in the cache memory subsystem, a copy of the data page of the data volume previously shared with the snapshot before the modifying of the data page;

flushing the copy of the data page to the storage device;

maintaining, in a table in the cache memory subsystem, a copy record containing information pertaining to a relationship between the data volume and the snapshot; and flushing the copy record to the storage device to complete the creation of the snapshot of the data volume.

2. The method of claim 1 further comprising:

maintaining each of the copy of the data page, the copy record, and the modified data page in a respective log record of a transaction log.

3. The method of claim 2 further comprising:

maintaining a chain of versions of the data page on the list, ranging from a youngest version to an oldest version.

4. The method of claim 2 wherein the list includes a plurality of versions of the data page, ranging from a youngest version to an oldest version of a parent data page, and wherein the method further comprises:

maintaining the list of the youngest version to the oldest version, which are indirectly owned by one or more copy volumes.

5. The method of claim 2 wherein the respective log record for each of the copy of the data page, the copy record, and the modified data page has a corresponding log sequence number (LSN), and wherein the method further comprises:

flushing, in log sequence order, the respective log record for each of the copy of the data page, the copy record, and the modified data page from the transaction log to the storage device.

6. The method of claim 5 wherein the data volume has an identifier, wherein the relationship between the data volume and the snapshot is defined at least in part by the identifier of the data volume and the LSN of the copy record, and wherein the maintaining of the copy record in the table in the cache memory subsystem includes maintaining a plurality of information fields in the copy record, the plurality of information fields including a first field containing the identifier of the data volume, and a second field containing the LSN of the copy record.

7. The method of claim 5 wherein the maintaining of the copy of the data page on the list in the cache memory subsystem includes maintaining, on the list in the cache memory subsystem, the copy of the data page and the LSN of the copy of the data page.

8. The method of claim 1 further comprising:

creating, in the cache memory subsystem, a second snapshot of the data volume, the second snapshot corresponding to a PIT copy of the data volume including the modified data page among the plurality of data pages, the modified data page corresponding to a first modification of the data page; and performing, in the cache memory subsystem, a second modification of the data page.

9. The method of claim 8 further comprising:

maintaining, on the list in the cache memory subsystem, the copy of the data page, and a copy of the first modification of the data page.

10. The method of claim 9 wherein the copy of the data page corresponds to an older version of the data page, and wherein the copy of the first modification of the data page corresponds to a younger version of the data page, and wherein the maintaining of the copy of the data page and the copy of the first modification of the data page on the list in the cache memory subsystem includes maintaining a chain of versions of the data page on the list, ranging from the younger version to the older version.

11. A data storage system, comprising:

a memory including a cache memory subsystem;

a storage device; and storage processing circuitry configured to execute a computer program out of the memory:

to initiate, in the cache memory subsystem, creation of a snapshot of a data volume, the snapshot corresponding to a point-in-time (PIT) copy of the data volume, the data volume including a plurality of data pages shared with the snapshot;

to modify, in the cache memory subsystem, a data page among the plurality of data pages included in the data volume;

to maintain, on a list in the cache memory subsystem, a copy of the data page of the data volume previously shared with the snapshot before the modifying of the data page;

to flush the copy of the data page to the storage device;

to maintain, in a table in the cache memory subsystem, a copy record containing information pertaining to a relationship between the data volume and the snapshot; and to flush the copy record to the storage device to complete the creation of the snapshot of the data volume.

12. The data storage system of claim 11 wherein the storage processing circuitry is further configured to execute the computer program out of the memory to maintain each of the copy of the data page, the copy record, and the modified data page in a respective log record of a transaction log.

13. The data storage system of claim 12 wherein the respective log record for each of the copy of the data page, the copy record, and the modified data page has a corresponding log sequence number (LSN), and wherein the storage processing circuitry is further configured to execute the computer program out of the memory to flush, in log sequence order, the respective log record for each of the copy of the data page, the copy record, and the modified data page from the transaction log to the storage device.

14. The data storage system of claim 13 wherein the data volume has an identifier, wherein the relationship between the data volume and the snapshot is defined at least in part by the identifier of the data volume and the LSN of the copy record, and wherein the storage processing circuitry is further configured to execute the computer program out of the memory to maintain a plurality of information fields in the copy record, the plurality of information fields including a first field containing the identifier of the data volume, and a second field containing the LSN of the copy record.

15. The data storage system of claim 13 wherein the storage processing circuitry is further configured to execute the computer program out of the memory to maintain, on the list in the cache memory subsystem, the copy of the data page and the LSN of the copy of the data page.

16. A computer program product including a set of non-transitory, computer-readable media having instructions that, when executed by processing circuitry of a computerized apparatus, cause the processing circuitry to perform a method of managing and creating snapshots in a cache-based storage system, the cache-based storage system including a cache memory subsystem and a storage device, the method comprising:

initiating, in the cache memory subsystem, creation of a snapshot of a data volume, the snapshot corresponding to a point-in-time (PIT) copy of the data volume, the data volume including a plurality of data pages shared with the snapshot;

modifying, in the cache memory subsystem, a data page among the plurality of data pages included in the data volume;

maintaining, on a list in the cache memory subsystem, a copy of the data page of the data volume previously shared with the snapshot before the modifying of the data page;

flushing the copy of the data page to the storage device;

maintaining, in a table in the cache memory subsystem, a copy record containing information pertaining to a relationship between the data volume and the snapshot; and flushing the copy record to the storage device to complete the creation of the snapshot of the data volume.

17. The computer program product of claim 16, wherein the method further comprises:

maintaining each of the copy of the data page, the copy record, and the modified data page in a respective log record of a transaction log, wherein the respective log record for each of the copy of the data page, the copy record, and the modified data page has a corresponding log sequence number (LSN), and wherein the method still further comprises:

flushing, in log sequence order, the respective log record for each of the copy of the data page, the copy record, and the modified data page from the transaction log to the storage device.

* * * * *